United States Patent
Yanagi et al.

(10) Patent No.: US 8,761,995 B2
(45) Date of Patent: Jun. 24, 2014

(54) VEHICLE MOTION CONTROL SYSTEM

(75) Inventors: Takashi Yanagi, Saitama (JP); Kiyoshi Wakamatsu, Saitama (JP); Takayuki Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 13/203,424

(22) PCT Filed: Mar. 5, 2010

(86) PCT No.: PCT/JP2010/001555
§ 371 (c)(1),
(2), (4) Date: Aug. 25, 2011

(87) PCT Pub. No.: WO2010/103768
PCT Pub. Date: Sep. 16, 2010

(65) Prior Publication Data
US 2011/0307142 A1    Dec. 15, 2011

(30) Foreign Application Priority Data
Mar. 9, 2009 (JP) .................................. 2009-055276

(51) Int. Cl.
*B60W 10/00* (2006.01)
*G06F 7/00* (2006.01)
*B60W 10/18* (2012.01)
*B60W 10/12* (2012.01)
*B60W 10/20* (2006.01)

(52) U.S. Cl.
USPC .............................. 701/32.7; 701/43; 701/48

(58) Field of Classification Search
USPC ....................................................... 701/29
See application file for complete search history.

(56) References Cited

U.S. PATENT DOCUMENTS

| | | | |
|---|---|---|---|
| 5,540,298 A * | 7/1996 | Yoshioka et al. | 180/169 |
| 5,615,117 A | 3/1997 | Serizawa | |
| 6,033,337 A | 3/2000 | Ohkuma et al. | |
| 8,073,592 B2 | 12/2011 | Nishimori et al. | |
| 2007/0112483 A1 * | 5/2007 | Jeong | 701/22 |
| 2008/0051941 A1 * | 2/2008 | Horiuchi et al. | 700/279 |

FOREIGN PATENT DOCUMENTS

| | | |
|---|---|---|
| DE | 197 35 015 A1 | 2/1999 |
| DE | 103 56 509 A1 | 7/2005 |
| EP | 0 463 310 A1 | 1/1992 |

(Continued)

*Primary Examiner* — Helal A Algahaim
*Assistant Examiner* — Charles J Han
(74) *Attorney, Agent, or Firm* — Carrier Blackman & Associates, P.C.; Joseph P. Carrier; William D. Blackman

(57) ABSTRACT

Provided is a vehicle motion control system that comprises a plurality of vehicle behavior control units that are controlled in a mutually coordinated manner, and is configured to operate as designed even when one of the vehicle motion control units should fail. If a RTC-ECU (61) has ceased a control action thereof owing to a failure thereof, a VSA-ECU (31) retains the last received coordination control signal from the RTC-ECU in EEPROM (37) so that the VSA-ECU (31) is enabled to continue the coordinated control according to the retained coordination control signal. At the same time, the VSA-ECU (31) transmits the coordination control signal retained in the EEPROM onto a CAN so that the transmitted coordination control signal may be used by other ECUS of other vehicle behavior control units such as an ATTS-ECU (41) and a STG-ECU (51). In this manner, the behavior of the vehicle may be optimized by the coordination control of the VSA unit and other vehicle behavior control units.

7 Claims, 4 Drawing Sheets

(56) References Cited

FOREIGN PATENT DOCUMENTS

| | | | |
|---|---|---|---|
| EP | 1 975 041 A2 | 10/2008 | |
| JP | 3110891 B2 | 11/2000 | |
| JP | 3179271 B2 | 6/2001 | |
| JP | 3214824 B2 | 10/2001 | |
| JP | 3340038 B2 | 10/2002 | |
| JP | 2005-263182 A | 9/2005 | |
| JP | 2006-056469 A | 3/2006 | |

* cited by examiner

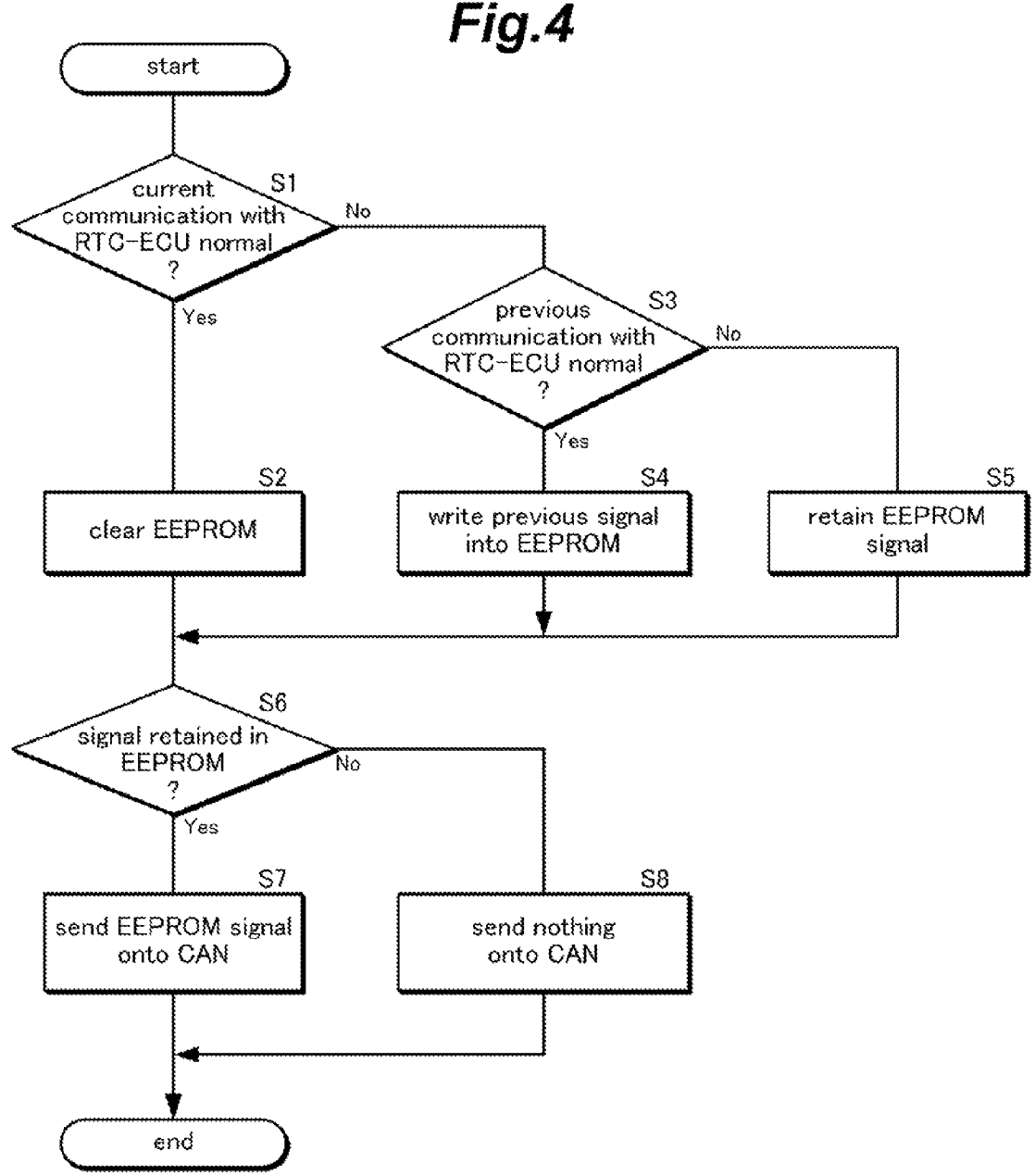

VEHICLE MOTION CONTROL SYSTEM

TECHNICAL FIELD

The present invention relates to a vehicle motion (behavior) control system that enables a plurality of vehicle behavior control units to operate in a mutually coordinated manner by controlling exchange of coordination control signals between the vehicle behavior control units.

BACKGROUND OF THE INVENTION

A motor vehicle may be equipped with various kinds of vehicle motion control units that control the motion (behavior) of the vehicle with the aim of improving the motion stability of the traveling vehicle. Such known vehicle motion control units include the rear wheel toe angle control unit that individually controls the rear wheel toe angle so as to stabilize the behavior of the vehicle (see patent document 1), the vehicle behavior stability assist unit that variably controls the braking forces of the four wheels so as to optimize the behavior of the vehicle (see patent document 2), the left and right drive force distribution unit that distributes a given drive force between the left and right drive wheels (see patent document 3), and the electric power steering unit that adjusts the assist force for the steering effort by using an electric motor in dependence on the behavior (yaw rate) of the vehicle so as to optimize the behavior of the vehicle (see patent document 4).

PRIOR ART

Patent Document(s)

Patent Document 1 JP3179271B
Patent Document 2 JP3214824B
Patent Document 3 JP3340038B
Patent Document 4 JP3110891B

SUMMARY OF THE INVENTION

Task to be Achieved by the Present Invention

In the motor vehicle equipped with a plurality of such vehicle motion control units, if the various vehicle motion control units are operated without any coordination between them, the control actions of the different control units may interfere with each other so that each control unit may be unable to provide a required control performance. To avoid this problem, the various control units may be configured to exchange coordination control signals among them so that the control actions of the various control units may be properly coordinated with each other.

For instance, in a vehicle equipped with a rear wheel toe angle control (RTC) unit, the vehicle may further comprise a vehicle behavior stability assist (VSA) unit and a right and left wheel torque splitting unit (active torque transfer system: ATTS) that are configured to modify the steering angle sensor value according to the rear wheel toe angle information provided by the rear wheel toe angle control (RTC) unit so that the various control actions may be appropriately coordinated.

Suppose that the RTC-ECU (rear toe control-electronic control unit) that makes up the control center for the RTC unit has become faulty, and the toe angle of the rear wheels cannot be controlled. In such a case, the sub CPU incorporated in the RTC-ECU executes a fail safe action by shutting off the power of the RTC main control unit, and this causes the toe angle of the rear wheels to be fixed at the value which was obtained immediately before the failure of the RTC unit had occurred. As a result, the VSA unit and ATTS unit are unable to receive any rear wheel toe angle information from the RTC-ECU, and hence unable to operate as designed.

The present invention was made in view of such a recognition by the inventors, and has a primary object to provide a vehicle motion control system that is configured to control a plurality of vehicle motion control units in a coordinated manner, and is able to operate as designed even when one of the vehicle motion control units should fail.

Means to Achieve the Task

To achieve such an object of the present invention, the present invention provides a vehicle motion control system for enabling a plurality of vehicle behavior control units to operate in a mutually coordinated manner, comprising: a first vehicle behavior control unit configured to generate a first coordination control signal; a second vehicle behavior control unit configured to operate in a coordinated manner with respect to the first vehicle behavior control unit according to the first coordination control signal; a coordination control signal storage device that stores the first coordination control signal; and a failure detection unit for detecting a failure of the first vehicle behavior control unit; wherein upon detection of a failure of the first vehicle behavior control unit, the second vehicle control unit is configured to maintain a coordinated operation thereof according to the coordination control signal stored in the first coordination control signal storage device immediately before the detection of the failure.

The "coordinated" as used herein refers to the mode of operation of a plurality of vehicle motion control units in a mutually coordinated manner such that at least one of the vehicle motion control units is controlled by the control state of another control unit or other control units according to the coordination control signals exchanged among the different vehicle motion control units. For instance, one of the vehicle behavior control units produces a control value according to a prescribed state variable detected by a sensor or the like, and modifies the control value according to a coordination control signal received from the other vehicle motion control unit, or replaces the control value with a different control value according to the coordination control signal. The vehicle behavior control unit serving as the sender of the coordination control signal not only determines the control signal for itself according to the prescribed state variable but also generates the coordination control signal for the other relevant vehicle motion control unit(s).

According to the present invention, upon detection of a failure of the first vehicle behavior control unit and hence the cessation of the control action thereof, the second vehicle control unit maintains a coordinated operation thereof according to the coordination control signal stored in the coordination control signal storage device immediately before the detection of the failure or based upon the knowledge of the freezing of the functionality of the control object of the first vehicle behavior control unit in the state thereof that existed at the time the failure occurred. Therefore, the activation of the second vehicle behavior control unit may be continued without causing any unexpected behavior of the vehicle. The freezing of the functionality of the control action as used herein may mean any state in which the relevant vehicle behavior control unit has become unable to perform an intended control action thereof, and this may include the cases where the power supply to the main control unit is terminated by the sub CPU on account of an abnormal power supply voltage and where the power supply to the vehicle behavior control unit is interrupted owing to a breakage of electric wire, a failure of a relay, or the like.

According to a certain aspect of the present invention, the vehicle motion control system further comprises a third vehicle behavior control unit (41, 51) configured to operate in a coordinated manner with respect to the first vehicle behavior control unit according to the first coordination control signal; wherein the second vehicle behavior control unit is incorporated with the coordination control signal storage device, and upon detection of the failure of the first vehicle behavior control unit by the failure detection unit, transmits a coordination control signal stored in the coordination control signal storage device immediately before the detection of the failure of the first vehicle behavior control unit; and wherein upon detection of the failure of the first vehicle behavior control unit by the failure detection unit, the third vehicle behavior control unit maintains a coordinated operation thereof according to the coordination control signal transmitted by the first vehicle behavior control unit.

In case the first vehicle behavior control unit has failed to provide the control action thereof owing to a failure of any kind, if the third vehicle behavior control unit is not provided with a storage device for the coordination control signal, the third vehicle behavior control unit could perform an unexpected control action. However, according to this aspect of the present invention, even when the third vehicle behavior control unit is not provided with a storage device for the coordination control signal, the third vehicle behavior control unit is enabled to maintain a coordinated operation thereof according to the coordination control signal transmitted by the first vehicle behavior control unit or by taking into account the influences of the control object of the first vehicle behavior control unit on the overall vehicle behavior so that the activation of the third vehicle behavior control unit may be continued without causing any unexpected behavior of the vehicle.

According to another aspect of the present invention, the first vehicle behavior control unit consists of a rear wheel toe angle control unit (61) that variably controls the toe angels of the rear wheels (3r); and the second vehicle behavior control unit consists of a vehicle stability assist (VSA) unit (31) that variably controls a braking force of each of four wheels of the vehicle.

Typically, the vehicle stability assist (VSA) unit not only constantly monitors the behavior of the vehicle according to the detection values of various sensors but also constantly monitors the states of other vehicle behavior control units or receives the coordination control signals from the other vehicle behavior control units for the purpose of preventing the slipping of the vehicle. According to the foregoing aspect of the present invention, even when any one of the other vehicle behavior control units has terminated the control action thereof owing to a failure thereof, the coordination control can be continued by using the coordination control signal obtained immediately before the occurrence of the failure. The rear wheel toe angle control (RTC) unit typically controls the behavior of the vehicle by using an electric actuator provided with a self locking capability. Therefore, upon occurrence of a failure in the RTC unit, the rear wheels are frozen at the angle which existed at the time of the occurrence of the failure. However, as the coordination control is performed by using the rear wheel toe angle which was received by the VSA unit immediately before the occurrence of the failure, the VSA unit or the third vehicle behavior control unit may be continued to be operated without causing any unexpected behavior of the vehicle.

In this case, the vehicle behavior control unit may consist of a right and left wheel torque splitting unit (active torque transfer system: ATTS) continuously distributing the drive force of the drive force between the right and left drive wheels, and an active front wheel steering unit that variably controls the steering ratio (or the ratio of the steering wheel angle to the front wheel steering angle) and actuates the front wheels or the steering wheel by using an assist motor.

Effect of the Invention

Upon occurrence of a failure of the first vehicle behavior control unit and hence the cessation of the control action thereof, the second vehicle control unit maintains a coordinated operation thereof according to the coordination control signal stored in the coordination control signal storage device immediately before the detection of the failure, and the third vehicle control unit maintains a coordinated operation thereof according to the coordination control signal transmitted by the first vehicle behavior control unit. The vehicle behavior control can be maintained by taking into account the influences of the first vehicle behavior control unit which has failed, and the vehicle is prevented from behaving in any unexpected manner.

BRIEF DESCRIPTION OF THE DRAWINGS

FIG. 4 is a flowchart showing the control process of the vehicle behavior control unit executed by a VSA-ECU.

DETAILED DESCRIPTION OF THE PREFERRED EMBODIMENTS

Now the present invention is described in the following with respect to a four-wheel motor vehicle (simply referred to as "vehicle" in the following description) incorporated with a vehicle motion control system embodying the present invention with reference to the appended drawings.

Figure 1:
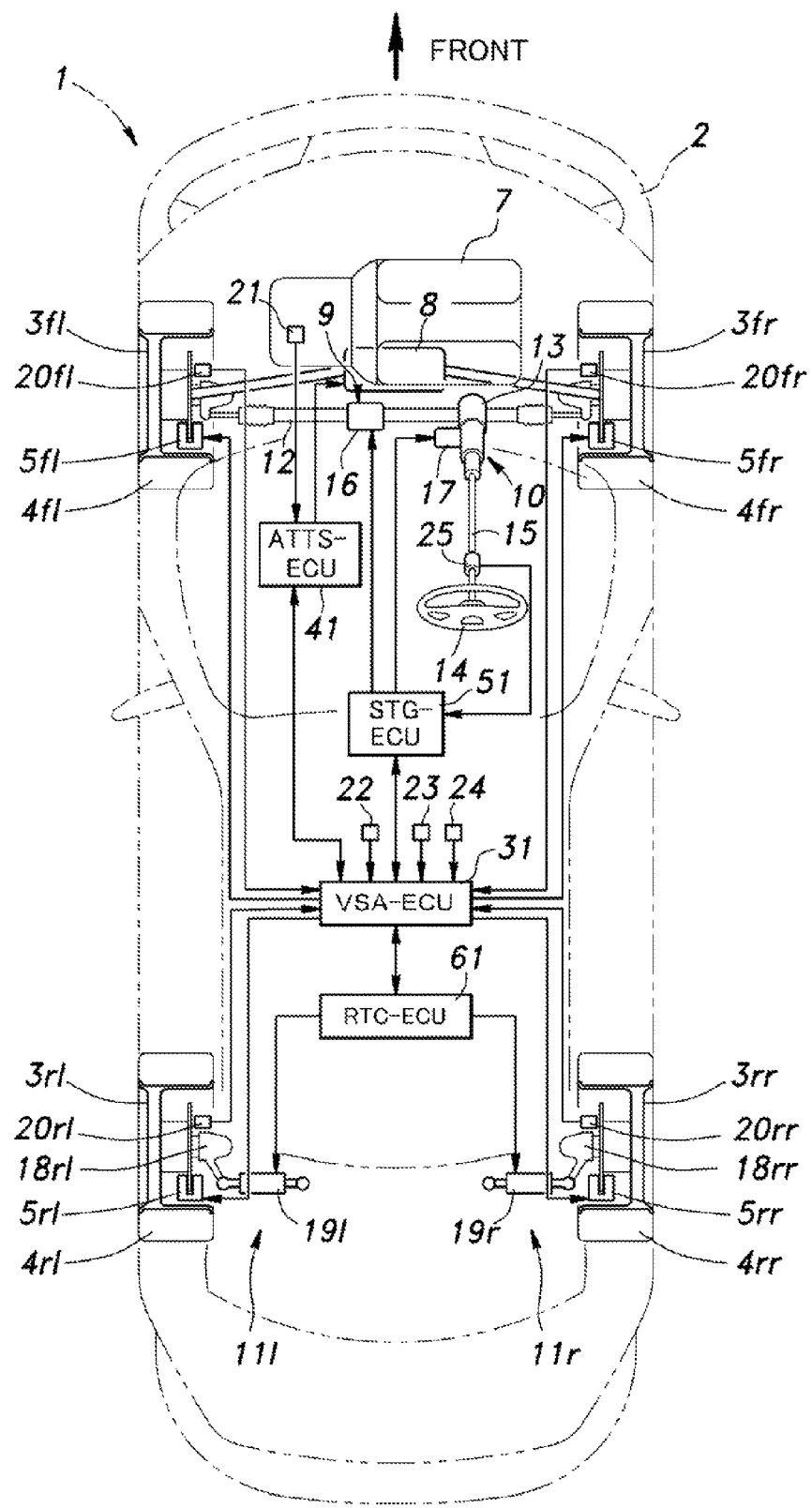
FIG. 1 is a simplified plan view showing the overall structure of a vehicle embodying the present invention.

Referring to FIG. 1, the overall structure of the vehicle 1 embodying the present invention is described in the following. In the following description, the four wheels 3 and the component parts associated with the individual wheels such as tires 4 and brakes 5 are denoted with numerals with suffixes indicating the position of the wheels and components parts. For instance, the left front wheel is denoted with 3fl, the right front wheel with 3fr, the left rear wheel with 3rl and right rear wheel with 3rr, while the wheels may also be simply denoted only with the numeral 3 when they are collectively referred to.

The vehicle 1 shown in FIG. 1 is provided with four wheels 3 on four corner positions of a vehicle body 2, and each wheel 3 is supported by the vehicle body 2 with a suspension system (not shown in the drawing) including suspension arms, a spring and a damper. Each wheel 3 is fitted with a tire 4 on the outer periphery thereof, and is internally provided with a brake (disk brake caliper) 5. The vehicle 1 is equipped with a VSA (vehicle stability assist)-ECU (electronic control unit) 31 that controls the motion or behavior of the vehicle by variably controlling the brake force of the brake 5 of each individual wheel 3.

The vehicle 1 is also provided with an engine 7 mounted in a front part thereof, an ATTS unit (active torque transfer system: right and left wheel torque splitting unit) 8 for continuously distributing the drive force of the engine 7 between the right and left front wheels 3fr and 3fl, an EPS unit (electric power steering unit) 9 for providing a steering assist force in steering the right and left front wheels 3fr and 3fl, a VGS unit (variable gear ratio steering unit) 10 for continuously varying the steering gear ratio and a pair of RTC units (rear toe control units) 11r and 11l for steering the left and right rear wheels 3rl and 3rr. The ATTS 8 and RTCs 11 are controlled by an ATTS-ECU 41 and a RTC-ECU 61, respectively, and the EPS 9 and VGS 10 are controlled by a STG-ECU 51.

The EPS unit 9 essentially consists of a steering gear including a rack 12 and a pinion not shown in the drawing, a steering shaft 15 having a rear end connected to a steering wheel 14, and an EPS motor 16 coaxially disposed with respect to the rack 12 to apply a steering assist force to the rack 12. The VGS unit 10 is of a planetary gear type, and includes an input shaft connected to the steering wheel 14 via the steering shaft 15 and an output shaft connected to the steering gear 13. The VGS unit 10 is configured to change the transmission ratio between the angular movement of the input shaft and the angular movement of the output shaft by activating a VGS motor 17.

Each RTC unit 11l, 11r consists of a linear RTC actuator 19l, 19r, a position sensor and other components interposed between the vehicle body 2 and a knuckle 18rl, 18rr of the corresponding rear wheel. Each RTC actuator 19 includes an RTC motor received in a housing attached to the vehicle body 2, a reduction gear unit, a feed screw mechanism using a trapezoidal thread and an output rod connected to a female thread member of the feed screw mechanism at one end and connected to the corresponding rear wheel knuckle 18 at the other end so that the output rod may extend and retract as the RTC motor is activated. The feed screw mechanism has a self lock function so that the input from the output rod is prevented from reversing the movement of the feed screw mechanism.

In addition to a wheel speed sensor 20 incorporated in each wheel 3 for detecting the rotational speed of the corresponding wheel, the vehicle 1 is provided with a vehicle speed sensor 21 for detecting the traveling speed of the vehicle 1. A lateral G sensor 22 for detecting the lateral acceleration, a fore and aft G sensor 23 for detecting the fore and aft acceleration and a yaw rate sensor 24 to detect the yaw rate are mounted on appropriate parts of the vehicle body 2. The steering shaft 15 is fitted with a steering angle sensor 25 for detecting the steering angle of the steering wheel 14.

The VSA-ECU 31, ATTS-ECU 41, STG-ECU 51 and RTC-ECU 61 each comprise a CPU, ROM, RAM, a peripheral circuit, an input/output interface and various drivers, and are connected to each other via a communication line, which consists of a CAN (controlled area network) in the illustrated embodiment, so that signals may be exchanged among the various ECUs.

The VSA-ECU 31 controls the operation of the brakes 5 via a hydraulic system not shown in the drawing. The hydraulic system includes four sets of PWM controlled solenoid valves and hydraulic circuits so that not only the hydraulic pressure produced by the brake pedal (or the brake master cylinder) is directly supplied to the brake 5 of each wheel 3 but also a distinct hydraulic pressure may be supplied to each brake 5 according to the drive signal from the VSA-ECU 31. The hydraulic system forwards the value of the hydraulic pressure supplied to each brake 5 to the VSA-ECU 31 as a value corresponding to the brake pressure of the corresponding brake 5.

Figure 2:
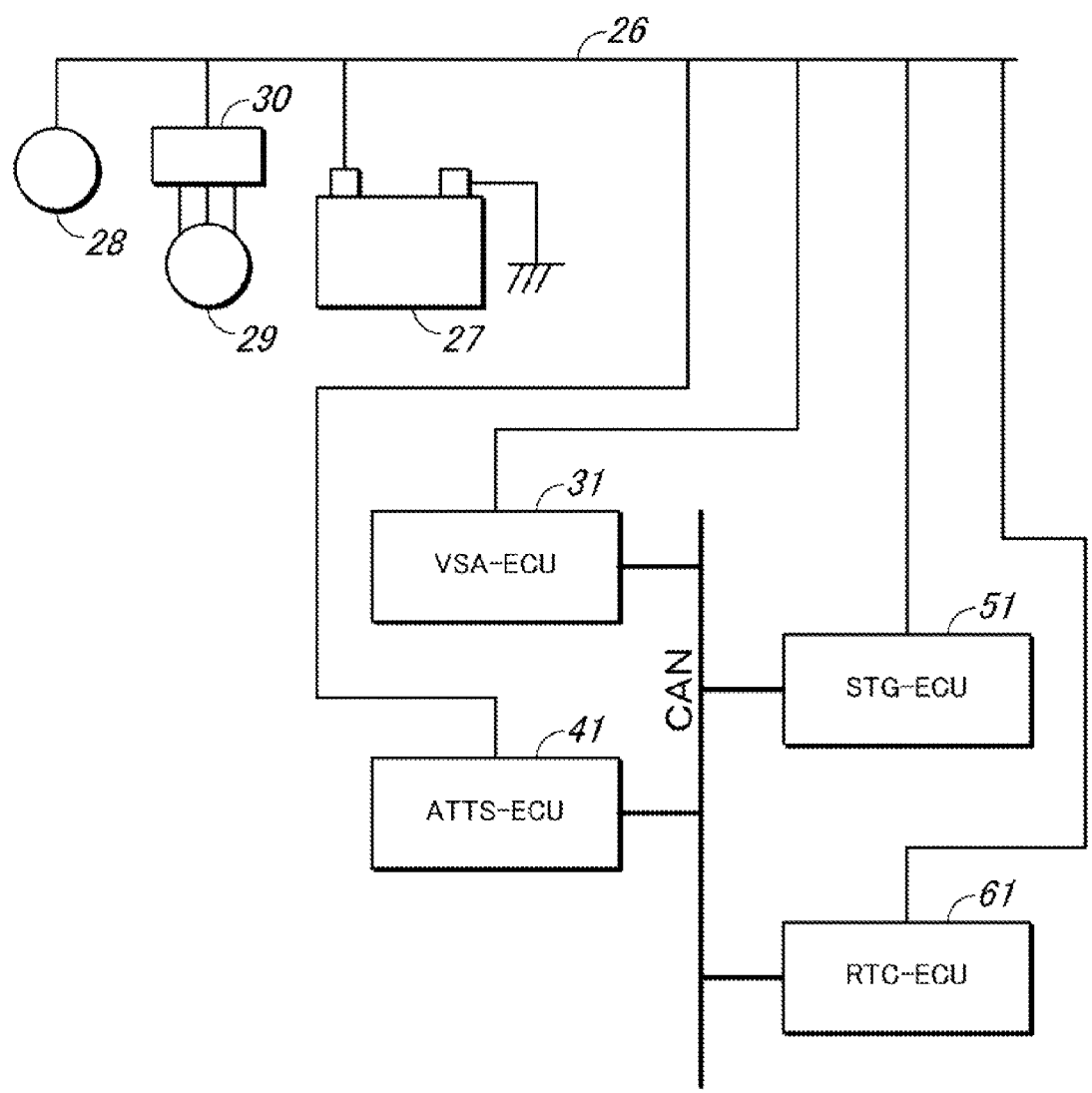
FIG. 2 is a block diagram of a vehicle motion control system embodying the present invention.

As shown in FIG. 2, the vehicle motion control system includes the VSA-ECU 31, ATTS-ECU 41, STG-ECU 51 and RTC-ECU 61, and these ECUs 31, 41, 51 and 61 receive supply of electric power from a battery 27 via a wire harness 26.

The battery 27 is also connected to a starter motor 28 for starting the engine 7. An alternator 29, configured to be driven by the engine 7, is connected to the battery 27 via a rectifier 30 so that the electric power generated by the alternator 29 electrically charges the battery 27. In the power system, if the voltage supplied to the VSA-ECU 31, ATTS-ECU 41, STG-ECU 51 and RTC-ECU 61 drops, and falls below the threshold level of any one of the ECUs, typically owing to a failure in the alternator 29, the ECU in question terminates the control operation thereof after executing a prescribed power shut-off control process by using a sub CPU provided in the ECU as will be described hereinafter.

Figure 3:
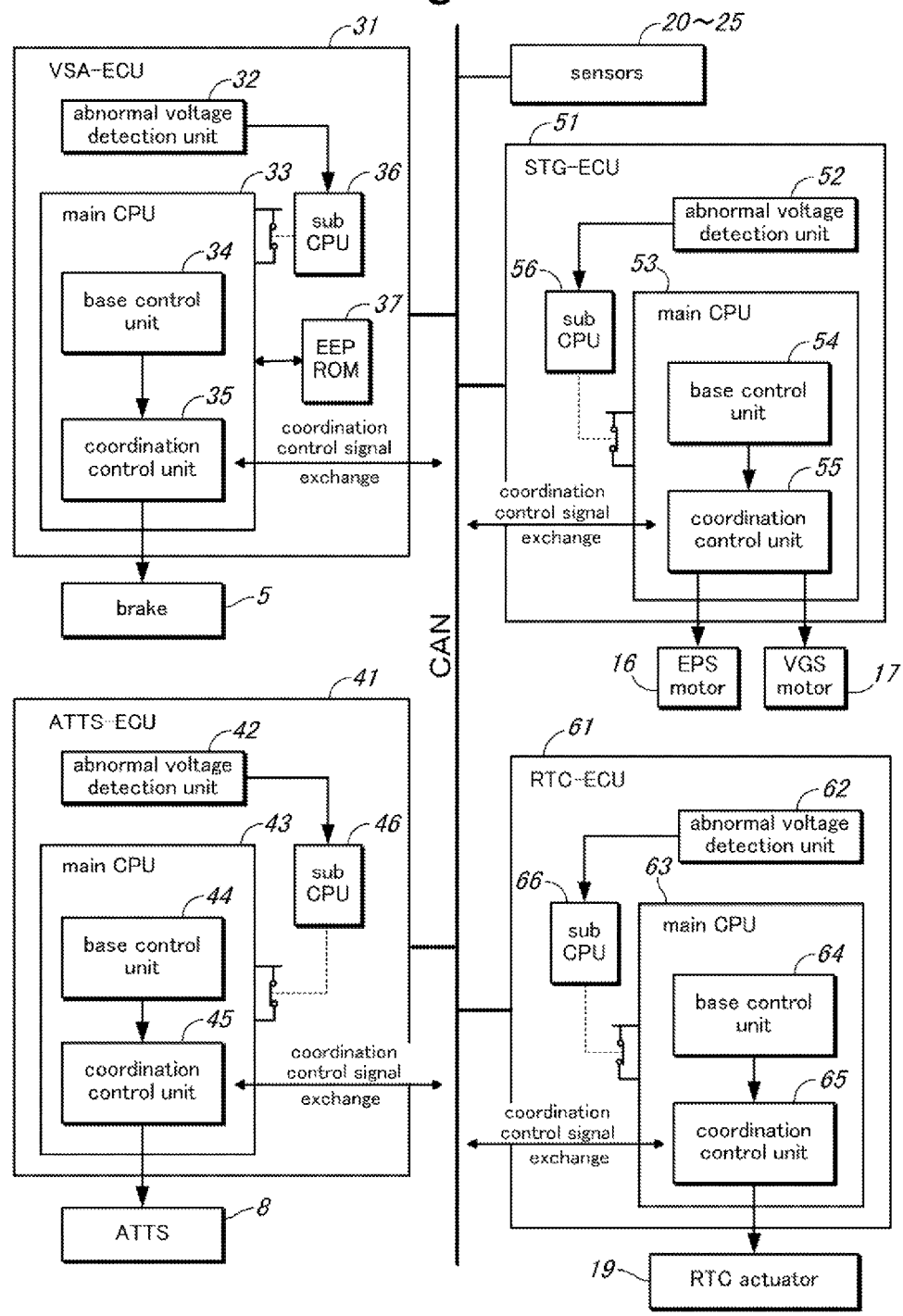
FIG. 3 is a more detailed block diagram of the vehicle motion control system embodying the present invention.

As shown in FIG. 3, the VSA-ECU 31 not only controls the hydraulic pressure of the brake 5 of each wheel 3 according to the required state variables detected by the various sensors such as the wheel speed sensor 20, vehicle speed sensor 21, lateral G sensor 22, yaw rate sensor 24 and steering angle sensor 25 so that the vehicle behavior may be optimally controlled through the control of the braking force of each individual wheel 3, but also constantly monitors the control states of the other vehicle motion control units such as the ATTS unit 8, EPS unit 9, VGS unit 10 and RTC units 11. The main CPU 33 comprises a base control unit 34 and a coordination control unit 35. The base control unit 34 computes various control values according to the state values detected by the corresponding sensors. The coordination control unit 35 corrects or modifies the control values computed by the base control unit 34 or converts the control values into different control values according to the coordination control signals received from the RTC-ECU 61, ATTS-ECU 41 and STG-ECU 51. The coordination control unit 35 of the VSA-ECU 31 in turn generates coordination control signals for the RTC-ECU 61, ATTS-ECU 41 and STG-ECU 51 to use, and the generated coordination control signals are transmitted to the RTC-ECU 61, ATTS-ECU 41 and STG-ECU 51 via the CAN at a regular time interval (such as 10 ms).

The ATTS-ECU 41 controls the ATTS unit 8 according to the prescribed state variables detected the various sensors such as the wheel speed sensor 20, vehicle speed sensor 21, lateral G sensor 22, fore and aft G sensor 23 and yaw rate sensor 24 so that the vehicle behavior may be optimized by suitably distributing the drive force between the left and right front wheels 3fl and 3fr and thereby applying a yaw rate to the vehicle body 2. The main CPU 43 for the ATTS-ECU 41 comprises a base control unit 44 and a coordination control unit 45 which are similar in function to the counterparts of the VSA-ECU 31.

The STG-ECU 51 controls the driving forces of the EPS motor 16 and VGS motor 17 according the required state values detected by the various sensors such as the vehicle speed sensor 21, lateral G sensor 22, yaw rate sensor 24 and steering angle sensor 25 so that the manual steering effort of the vehicle operator may be assisted and the steering angle of the front wheels 3f may be actively controlled for the optimization of the lateral stability or behavior of the vehicle 1. Similarly as the VSA-CPU 31, the main CPU 53 of the STG-ECU 51 comprises a base control unit 54 and a coordination control unit 55 which are similar in function to the counterparts of the VSA-CPU 31.

The RTC-ECU 61 controls the right and left RTC actuators 19 according the required state values detected by the various sensors such as the vehicle speed sensor 21, lateral G sensor 22, yaw rate sensor 24 and steering angle sensor 25, and also by a front wheel steering angle sensor not shown in the drawing so that the toe angles of the left and right rear wheels 3r may be controlled for the optimum behavior the vehicle 1. Similarly as the VSA-CPU 31, the main CPU 63 of the RTC-ECU 61 comprises a base control unit 64 and a coordination control unit 65 which are similar in function to the counterparts of the VSA-CPU 31.

The coordination control signals exchanged among the ECUs 31, 41, 51 and 61 of the VSA, ATTS, STG and RTC units may take various forms depending on the control logic of each ECU. For instance, The RTC-ECU 61 may forward the control value thereof (the toe angles of the left and right rear wheels 3r) to the VSA-ECU 31. Alternatively, the VSA-ECU 31 may receive coordination control signals indicating the brake hydraulic pressures or other coordination control signals derived from other vehicle motion or behavior control units.

The ECUs 31, 41, 51 and 61 of the VSA, ATTS, STG and RTC units may each comprise an abnormal voltage detection unit 32, 42, 52, 62 and a sub CPU 36, 46, 56, 66. Each abnormal voltage detection unit 32, 42, 52, 62 may be configured to detect an abnormal drop in the voltage supplied to the corresponding CPU from the battery 27. Upon detection of such an abnormal voltage drop, the corresponding sub CPU 36, 46, 56, 66 shuts off the supply of electric power to the corresponding ECU 31, 41, 51, 61, and terminates the control action thereof.

The VSA-ECU 31 further comprises EEPROM 37 to store the coordination control signals received from the other ECUs 41, 51 and 61. For instance, when the RTC-ECU 61 has terminated the control action thereof and stopped sending out the coordination control signal owing to an abnormal voltage drop, the VSA-ECU 31 retains the coordination control signal most recently received from the RTC-ECU 61 or the coordination control signal indicating the state of the RTC units 11 immediately before the termination of the control action of the RTC-ECU 61 in the EEPROM 37. The VSA-ECU 31 is thereby allowed to continue the coordination control based on this data, and send out the retained coordination control signal onto the CAN to enable the other ECUs 41 and 51 to use the retained coordination control signal of the RTC-ECU 61. Therefore, even after the RTC-ECU 61 has ceased to operate due to a failure of any sort, the ATTS-ECU 41 and STG-ECU 51 are enabled to continue the coordination control of the ATTS unit 8, EPS motor 16 and VGS motor 17 according to the coordination control signal of the RTC-ECU 61 provided by the VSA-ECU 31.

In the following is described the process of controlling the behavior of the vehicle by the VSA-ECU 31 when the RTC-ECU 61 has ceased to operate by referring to FIG. 4. When the engine 7 is started, the VSA-ECU 31 repeats the process of controlling the behavior of the vehicle described in the following at a prescribed control time interval (10 ms, for instance).

First of all, the VSA-ECU 31 determines if the current communication with the RTC-ECU 61 or the receipt of the coordination control signal from the RTC-ECU 61 has been properly executed, or if a new coordination control signal has been newly received (step 1). If the current communication with the RTC-ECU 61 has been properly executed in step 1 (Yes), the VSA-ECU 31 clears the information written in the EEPROM 37 (step 2).

On the other hand, if the current communication with the RTC-ECU 61 has not been properly executed in step 1 (No), the VSA-ECU 31 determines if the previous communication with the RTC-ECU 61 was properly executed (step 3). If the previous communication with the RTC-ECU 61 was properly executed in step 3 (Yes), the VSA-ECU 31 writes the coordination control signal received in the previous communication into the EEPROM 37 (step 4). On the other hand, if the previous communication with the RTC-ECU 61 was not properly executed in step 3 (No), the VSA-ECU 31 retains the coordination control signal written in the EEPROM 37 (step 5) or the coordination control signal received from the communication with the RTC-ECU 61 most recently is retained.

Then, the VSA-ECU 31 determines if the coordination control signal received from the RTC-ECU 61 is stored in the EEPROM 37 (step 6). If the coordination control signal received from the RTC-ECU 61 is stored in the EEPROM 37 in step 6 (Yes), as it means that the RTC-ECU 61 has not transmitted the coordination control signal, the VSA-ECU 31 transmits the coordination control signal stored in the EEPROM 37 onto the CAN (step 7), and the control process is concluded.

On the other hand, if the value of the coordination control signal is not retained in step 6 (No), nothing is transmitted onto the CAN (step 8), and the control process is concluded.

In this manner, the VSA-ECU 31 is provided with the EEPROM 37, and when the coordination control signal is not received from the RTC-ECU 61, as the coordination control signal last received from the RTC-ECU 61 is stored in the EEPROM 37, the coordination control process that takes into account the influences of the toe angle of the rear wheels 3r on the behavior of the vehicle can be maintained according to this retained coordination control signal. Therefore, the vehicle 1 is prevented from behaving in an unexpected manner owing to the activation of the VSA unit.

In such a case, as the VSA-ECU 31 transmits the coordination control signal of the RTC-ECU 61 stored in the EEPROM 37 to the ATTS-ECU 41 and STG-ECU 51 via the CAN, the ECUs 41 and 51 are enabled to continue the coordination control process that takes into account the influences of the toe angle of the rear wheels 3r on the behavior of the vehicle, and the vehicle 1 is prevented from behaving in an unexpected manner owing to the activation of the ATTS unit 8, EPS unit 9 and/or VSG 10 unit.

Also, as the VSA-ECU 31 is provided with the EEPROM 37, and the VSA-ECU 31 is enabled to constantly monitor the state of the RTC-ECU 61 (or receives the coordination control signal therefrom), and upon detection of any possible cessation of the control action of the RTC-ECU 61, use the coordination control signal that immediately precedes the cessation of the control action for the various coordination control processes without any delay.

FIG. 3 shows the example in which the ECUs 31, 41, 51 and 61 of the EPS, VSA and RTC units exchange coordination control signals in both ways, but the exchange of the coordination control signals may also be executed only in one way. Thus, the mode of exchange of the coordination control signals may be appropriately selected depending on the nature of the control logic of the coordination control units 35, 45, 55 and 65.

The present invention has been described in term of a concrete embodiment, but the present invention is not limited by this specific embodiment. For instance, the foregoing embodiment was related to the case where the RTC-ECU 61 ceases to operate owing a failure thereof, but the present invention may also be applied to the cases where the VSA-ECU retains the coordination control signal last received from the control units of the ATTS 8 or the planetary gear type VGS 10 when the ATTS 8 keeps the drive force distribution ratio at a fixed value owing the failure of the ATTS-ECU 41 or when the VGS 10 keeps the steering gear ratio at a fixed value owing to the failure of the control unit (STG-ECU 51), as the case may be. It is also possible that an ECU other than the VSA-ECU 31 such as an ECU specially provided for the coordination control process is configured to retain the coordination control signal. The foregoing example was directed to a vehicle coordination control system including a VSA, an ATTS, an EPS, a VGS and a RTC, but the present invention is equally applicable to vehicle coordination control systems including other units for the motion or behavior control of the vehicle. Furthermore, the coordination control signals were exchanged via the CAN in the foregoing embodiment, but the present invention may be implemented so as to use other modes of communication such as the Flex Ray. The specific structure of the vehicle and the particular control process may be appropriately modified without departing from the spirit of the present invention.

GLOSSARY

1 vehicle
3 wheel
5 brake
7 engine
8 ATTS
9 EPS
10 VGS
11 RTC
16 EPS motor
17 VGS motor
19 RTC actuator
31 VSA-ECU
37 EEPROM
41 ATTS-ECU
51 STG-ECU
61 RTC-ECU

The invention claimed is:

1. A vehicle motion control system for enabling a plurality of vehicle behavior control units to operate in a mutually coordinated manner, comprising:
    a first vehicle behavior control unit including a first central processing unit (CPU) programmed to generate a first coordination control signal;
    a second vehicle behavior control unit including a second CPU different from the first CPU and programmed to operate in a coordinated manner with respect to the first vehicle behavior control unit according to the first coordination control signal;
    a third vehicle behavior control unit including a third CPU different from the first and second CPUs and programmed to operate in a coordinated manner with respect to the first vehicle behavior control unit according to the first coordination control signal;
    a coordination control signal storage device that stores the first coordination control signal; and
    a failure detection unit for detecting a failure of the first vehicle behavior control unit;
    wherein the second vehicle behavior control unit is incorporated with the coordination control signal storage device, and upon detection of the failure of the first vehicle behavior control unit by the failure detection unit, transmits to the third vehicle behavior control unit the first coordination control signal stored in the coordination control signal storage device immediately before the detection of the failure of the first vehicle behavior control unit; and
    wherein upon detection of the failure of the first vehicle behavior control unit, the second vehicle control unit is configured to maintain a coordinated operation thereof according to the first coordination control signal stored in the coordination control signal storage device immediately before the detection of the failure, and the third vehicle behavior control unit maintains a coordinated operation thereof according to the first coordination control signal transmitted by the second vehicle behavior control unit.

2. The vehicle motion control system according to claim 1, wherein
    the first vehicle behavior control unit consists of a rear wheel toe angle control unit that variably controls the toe angels of the rear wheels; and
    the second vehicle behavior control unit consists of a vehicle stability assist (VSA) unit that variably controls a braking force of each of four wheels of the vehicle.

3. The vehicle motion control system according to claim 1, wherein the first coordination control signal coordinates actions of the first CPU of the first vehicle behavior control unit, the second CPU of the second vehicle behavior control unit, and the third CPU of the third vehicle behavior control unit.

4. The vehicle motion control system according to claim 1, wherein each of the first CPU of the first vehicle behavior control unit, the second CPU of the second vehicle behavior control unit, and the third CPU of the third vehicle behavior control unit generates coordination control signals that are transmitted to the other CPUs of the vehicle behavior control units.

5. The vehicle motion control system according to claim 1, wherein each of the first vehicle behavior control unit, the second vehicle behavior control unit, and the third vehicle behavior control unit includes a coordination control unit which generates a coordination control signal that is shared with the other coordination control units of the other vehicle behavior control units.

6. The vehicle motion control system according to claim 1, wherein the system further includes a controlled area network interconnecting the first vehicle behavior control unit, the second vehicle behavior control unit, and the third vehicle behavior control unit and through which the first coordination control signal is transmitted.

7. The vehicle motion control system according to claim 1, wherein each of the first vehicle behavior control unit, the second vehicle behavior control unit, and the third vehicle behavior control unit includes a failure detection unit for detecting failure of the corresponding control unit.

* * * * *